US006616247B2

(12) United States Patent
Mohr

(10) Patent No.: US 6,616,247 B2
(45) Date of Patent: Sep. 9, 2003

(54) VEHICLE BRAKE SYSTEM HAVING A GAS PRESSURE ACCUMULATOR

(75) Inventor: Kurt Mohr, Halsenbach (DE)

(73) Assignee: Lucas Varity GmbH (DE)

( * ) Notice: Subject to any disclaimer, the term of this patent is extended or adjusted under 35 U.S.C. 154(b) by 0 days.

(21) Appl. No.: 10/143,731

(22) Filed: May 9, 2002

(65) Prior Publication Data

US 2002/0180260 A1 Dec. 5, 2002

Related U.S. Application Data

(63) Continuation of application No. PCT/EP00/10809, filed on Nov. 2, 2000.

(30) Foreign Application Priority Data

Nov. 11, 1999 (DE) ........................................ 199 54 326

(51) Int. Cl.[7] ................................................ F16L 55/04
(52) U.S. Cl. ........................................... 303/87; 138/30
(58) Field of Search ............................. 303/87, 85, 10, 303/11; 138/30, 31

(56) References Cited

U.S. PATENT DOCUMENTS 3,653,729 A * 4/1972 Newell et al. ................ 303/13
4,858,898 A 8/1989 Niikura et al.
4,997,009 A 3/1991 Niikura et al.
5,152,586 A * 10/1992 Burgdorf ................. 303/113.4
6,076,558 A * 6/2000 Mohr et al. .................... 138/30
6,189,572 B1 * 2/2001 Ruffer et al. ................. 138/30
6,363,719 B2 * 4/2002 Mohr et al. .................... 60/414

FOREIGN PATENT DOCUMENTS

| | | |
|---|---|---|
| DE | 3900899 | 7/1989 |
| DE | 3901261 | 7/1990 |
| JP | 8-121401 | 5/1996 |

* cited by examiner

*Primary Examiner*—Matthew C. Graham
(74) *Attorney, Agent, or Firm*—MacMillan, Sobanski & Todd, LLC

(57) ABSTRACT

A vehicle brake system has a gas pressure accumulator (10) comprising a housing (12), the interior of which is divided by metal bellows (16) into a gas-sensed gas chamber (20) and a fluid chamber (22). Via a feed line (24) a fluid may be supplied under pressure to and removed from the fluid chamber (22), wherein provided between the fluid chamber (22) and the feed line (24) is a valve arrangement (74), which closes when the pressure in the feed line (24) drops below a minimum value and opens when the pressure exceeds the minimum value. To increase the operational reliability of the gas pressure accumulator (10), the valve arrangement (74) closes when the pressure in the feed line (24) exceeds a maximum value and opens when the pressure drops below the maximum value.

14 Claims, 2 Drawing Sheets

VEHICLE BRAKE SYSTEM HAVING A GAS PRESSURE ACCUMULATOR

CROSS REFERENCE TO RELATED APPLICATIONS

This application is a continuation of International Application No. PCT/EP00/10809 filed Nov. 2, 2000, which claims priority to German Patent Application No. 19954326.7 filed Nov. 11, 1999, the disclosures of which are incorporated herein by reference.

BACKGROUND OF THE INVENTION

The invention relates to a vehicle brake system having a gas pressure accumulator, which comprises a housing, the interior of which is divided by metal bellows into a gas-filled gas chamber and a fluid chamber, to which via a feed line a fluid may be supplied under pressure and removed. In said case, disposed between the fluid chamber and the feed line is a valve arrangement, which closes when the pressure in the feed line drops below a minimum value and opens when the pressure exceeds the minimum value. The invention further relates to such a gas pressure accumulator.

The fluid chamber of such gas pressure accumulators is filled, during operation of the vehicle brake system, counter to the pressure in the gas chamber partially or completely with brake fluid, in order to store the latter.

From DE 39 01 261 A1 a pressure accumulator for hydraulic systems is known, which comprises a housing, the interior of which is subdivided by two metal bellows into a gas chamber and a fluid chamber, wherein the latter is connected to the hydraulic system by a valve actuated by metal bellows. In said case, a valve body is fastened by a retaining body to one of the metal bellows, which moves the valve body onto a valve seat when the maximum admissible quantity of fluid has been removed from the fluid chamber. The valve body therefore closes the fluid chamber. With said valve it is possible merely to ensure that the metal bellows are not damaged in the event of a further drop of pressure in the hydraulic system. DE 39 01 261 A1 does admittedly provide a so-called accumulator charging valve but its function and mode of operation are not explained in said printed publication.

Particularly high standards are demanded of vehicle brake systems with regard to the operability and reliability of the equipment.

The object of the invention is therefore to overcome the previously described drawbacks and design the vehicle brake system having a gas pressure accumulator in such a way that the gas pressure accumulator remains operable even in the event of failure of another device of the vehicle brake system (e.g. the accumulator charging valve described in DE 39 01 261 A1).

SUMMARY OF THE INVENTION

Solution According to the Invention

The object is achieved according to the invention by a vehicle brake system of the type described initially having a gas pressure accumulator, in which the valve arrangement closes when the pressure in the feed line exceeds a maximum value and opens when the pressure drops below the maximum value. The object is further achieved by such a gas pressure accumulator.

By virtue of the design according to the invention the pressure in the fluid chamber of the gas pressure accumulator is limited to a maximum value, with the result that the metal bellows themselves remain operable even in the event of extremely high pressure in the feed line. The valve arrangement in said case performs a dual function. It closes the fluid chamber when the pressure in the feed line is below minimum pressure or above maximum pressure and opens it when the pressure is between minimum and maximum pressure.

An advantageous development of the gas pressure accumulator provides that the metal bellows during supply and removal of the fluid executes a stroke motion, by means of which the valve arrangement is actuated. Thus, closing of the fluid chamber is linked directly to the motion of the metal bellows, with the result that a self-contained safety system is formed.

In a first advantageous refinement of the invention, the valve arrangement comprises a piston, which is provided on the metal bellows and may be displaced along an axis between two sealing seats, which are arranged axially spaced-apart inside a hollow cylinder provided on the housing. In an alternative advantageous refinement, the valve arrangement comprises a hollow cylinder, which is provided on the metal bellows, is directed along an axis, has two internally disposed, axially spaced-apart sealing seats and is disposed in an axially displaceable manner around a piston provided on the housing. In said refinements the dual function of the valve arrangement is realized in a particularly simple manner.

An advantageous development of the sealing seats provides that the latter comprise paraxial sealing surfaces. The piston may slide against said sealing surfaces during axial displacement of the piston and/or of the hollow cylinder. The piston in said case retains the sealing function. As a result of elasticity or thermal expansion the volume of the gas and the fluid may change. The housing or the valve arrangement may moreover deform. In said case, the volume of the gas chamber and fluid chamber is slightly altered. In the case of the braking equipment according to the invention, the metal bellows are displaceable along the sealing surfaces and hence may compensate the differential pressures, which arise, without being damaged.

There is advantageously connected to the hollow cylinder a coaxial mandrel, on which the piston is guided or which is guided in the piston. By said means a guided movement of the piston relative to the sealing seats is possible and, at the same time, a compact form of construction of the gas pressure accumulator is achieved.

According to a development, the metal bellows are substantially in the shape of a hollow cylinder and the piston as well as the hollow cylinder are disposed radially inside the metal bellows, with the result that a particularly compact form of construction is achieved.

An advantageous refinement provides that the stroke motion of the metal bellows is delimited by two end stops in order to select defined end positions for the movable components. In the end positions the valve arrangement is in both cases closed.

A seal or a sealing seat is advantageously formed on at least one end stop. On the end stop, therefore, a redundant seal is formed, which enables particularly good sealing. In a particularly advantageous manner the redundant seal is disposed on the end stop delimiting the normal position of the piston. Thus, the gas pressure accumulator is sealed particularly well when the pressure in the feed line is lower than the admissible minimum pressure. The pressure in the feed line, the so-called system pressure of the vehicle brake system, may drop below said minimum pressure, the so-called gas admission pressure, especially during extended stationary periods of the vehicle.

The gas pressure accumulator may alternatively be provided with a valve arrangement, which is provided with at least one redundant seal on an end stop but does not have the dual function described above. Given such a valve arrangement, the piston as closing element during a closing motion first contacts a first sealing seat and effects sealing there. Then the piston contacts a second sealing seat, which forms an end stop for the closing element, and effects redundant sealing there. The first sealing seat may correspond to one of the sealing surfaces described above.

To guarantee the necessary sealing of the valve arrangement, at least one seal is advantageously disposed on the piston and may effect sealing against at least one sealing seat.

BRIEF DESCRIPTION OF THE DRAWINGS

Further features and properties are explained in the description of two embodiments with reference to the accompanying drawings.

DETAILED DESCRIPTION OF THE INVENTION

Figure 1:
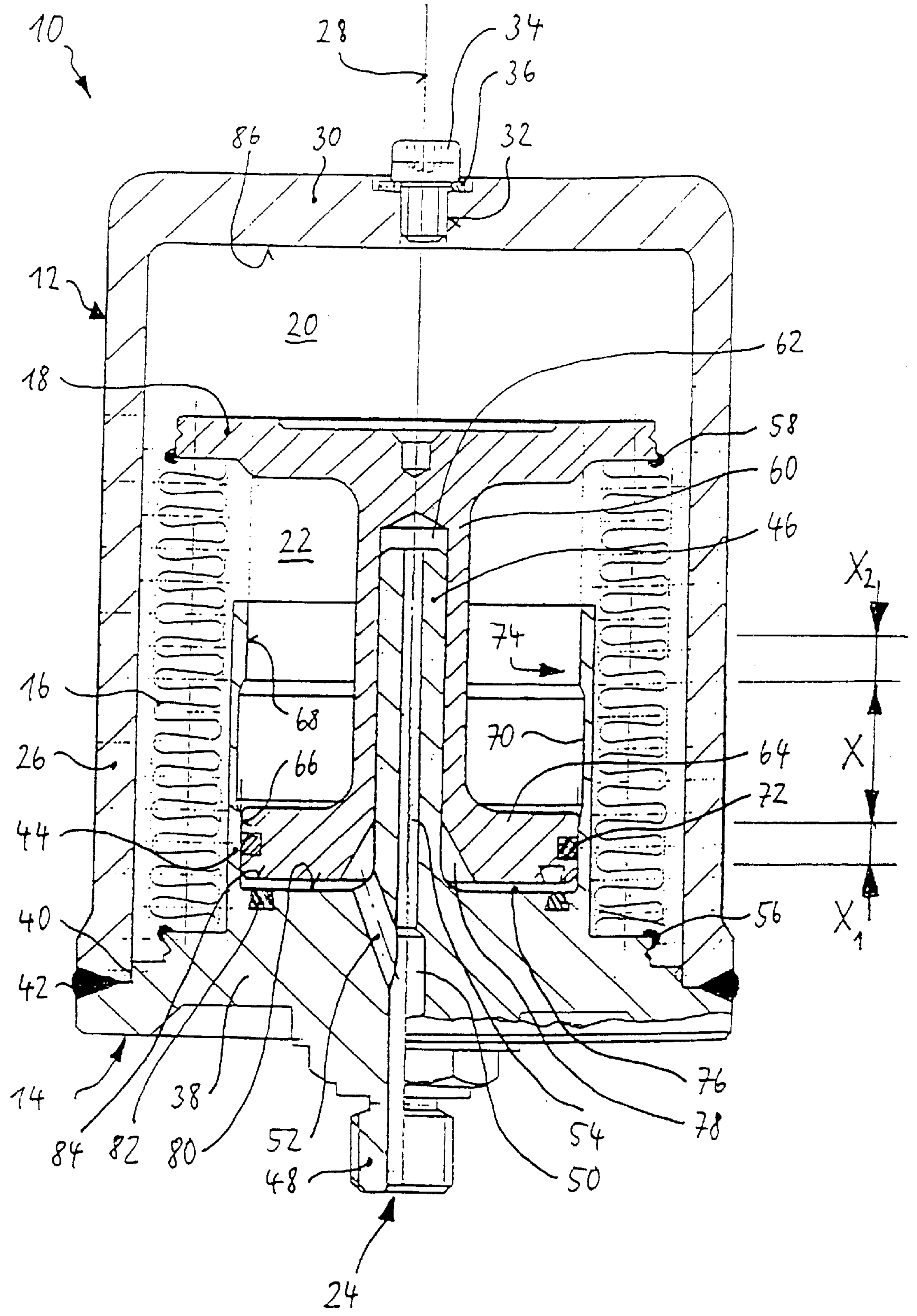
FIG. 1 shows a first embodiment of a gas pressure accumulator according to the invention in longitudinal section.
Figure 2:
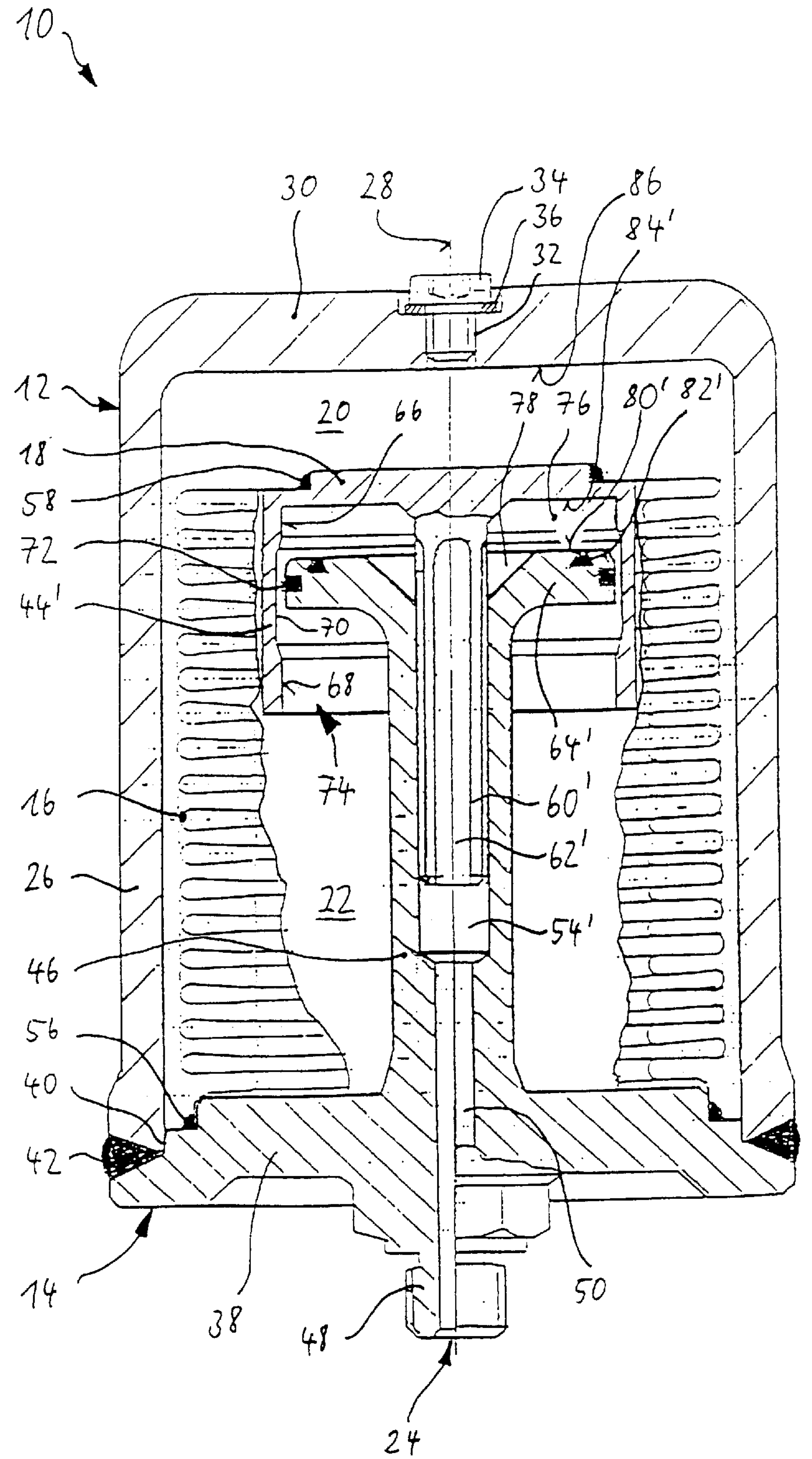
FIG. 2 shows a second embodiment of a gas pressure accumulator according to the invention in longitudinal section.

A gas pressure accumulator 10 illustrated in FIGS. 1 and 2 comprises a can-shaped housing 12, which is closed by a cover 14. The interior of the housing 12 is divided by metal bellows 16, which adjoin the cover 14, and by a disk 18 fastened in a gastight manner thereto into a gas chamber 20 and a fluid chamber 22. The gas chamber 20 is filled with a pressurized gas. The cover 14 is penetrated by a feed line 24, through which a fluid is supplied to the fluid chamber 22 when the pressure in the feed line 24 rises. The fluid is stored in the fluid chamber 22 and removed from the latter when the pressure in the feed line 24 drops.

The housing 12 has a cylindrical outer wall 26 with a longitudinal axis 28. Adjoining the outer wall 26 is a disk-shaped end wall 30, formed coaxially in which is a threaded bore 32, through which the gas may be supplied at a so-called gas admission pressure into the gas chamber 20. The threaded bore 32 is closed by a screw plug 34, which rests against a sealing washer 36.

The cover 14 has a disk-shaped closing portion 38, which by means of a shoulder 40 formed on the circumference thereof is centred in and supported against the outer wall 26 of the housing 12. The disk-shaped closing portion 38 is connected in a gastight manner to the outer wall 26 by a weld seam 42.

In the embodiment illustrated in FIG. 1, a hollow cylinder 44 and a mandrel 46 are integrally formed coaxially on the side of the closing portion 38 directed towards the interior of the housing 12. Integrally formed coaxially on the outside of the closing portion 38 is a connection 48, which is connected by substantially axially directed bores 50, 52 and 54 to the interior of the housing 12.

The metal bellows 16 are folded, substantially cylindrical and connected at both axial ends by weld seams 56 and 58 in a gastight manner to the closing portion 38 and the disk 18 respectively.

The disk 18 is directed normally to the axis and integrally connected to a coaxial rod 60, formed in which is an axial bore 62, by means of which the rod 60 is guided on the mandrel 46. Integrally adjoining the rod 60 is a piston 64, the diameter of which is greater than that of the rod 60.

Formed on the inner periphery of the hollow cylinder 44 are two axially spaced-apart paraxial sealing surfaces 66 and 68, which are axially aligned and each form a sealing seat. Axially between the sealing surfaces 66 and 68 a recess 70 is formed in the inner periphery of the hollow cylinder 44 so that the diameter of the latter in said region is greater than the diameter of the sealing seats on the sealing surfaces 66 and 68.

The piston 64 has a circumferential groove, in which a seal 72 in the form of a sealing ring is inserted or injected. The seal 72 is designed in such a way that it cooperates with the sealing surface 66 or 68 and hence forms a valve arrangement 74, which may effect dual sealing in a fluid-tight manner.

FIG. 1 shows the metal bellows 16 in a position, in which virtually no fluid is stored in the gas pressure accumulator 10, i.e. the pressure in the fluid chamber 22 has reached its minimum value, the gas admission pressure. The piston 64 in said case is situated almost in a normal position, in which the seal 72 rests against the sealing surface 66 and effects sealing there. Between the piston 64, the hollow cylinder 44 and the closing portion 38 of the cover 14 a so-called admission chamber 76 is therefore created, which is connected only by the bore 52 to the connection 48 but is otherwise closed. The valve arrangement is therefore closed between the feed line 24 and the fluid chamber 22. As no fluid may pass from the fluid chamber 22 into the admission chamber 76, even in the event of a drop of the pressure at the connection 48 the pressure in the fluid chamber 22 remains constant and limited to the minimum value. The metal bellows 16 are therefore reliably protected from damage in the event of a pressure drop.

When the pressure at the connection 48 and/or the feed line 24 rises, the pressure in the admission chamber 76 is also increased and the piston 64 is moved axially, in relation to FIG. 1, upwards, wherein the metal bellows 16 are extended and the gas chamber 20 is reduced in size. In the region of the recess 70 the incoming fluid may in said case flow around the piston 64 and therefore acts directly upon the metal bellows 16 and/or the disk 18. The rising fluid pressure moves the piston 64, which is connected to the disk 18, in said case virtually free of friction in the region of a stroke distance X, which corresponds to the operating stroke of the gas pressure accumulator 10. Fluid may in said case pass through the bore 54 into the bore 62, with the result that a pressure compensation occurs there.

If the pressure at the connection 48 continues to rise, at a so-called maximum pressure in the fluid chamber 22 the seal 72 of the piston 64 reaches the sealing surface 68 and effects sealing there. The piston 64 is situated almost in its end position and the valve arrangement 74 once more closes between the fluid chamber 22 and the feed line 24 and/or the admission chamber 76. The metal bellows 16 are therefore protected from being damaged by excess pressure since no fluid may pass from the admission chamber 76 into the fluid chamber 22.

At the sealing surfaces 66 and 68 the piston 64 may slide with the seal 72 along an axial stroke distance $X_1$ and $X_2$ respectively. During said stroke distances $X_1$ and $X_2$ the sealing is maintained, while a slight pressure compensation between the fluid chamber 22 and the admission chamber 76 is possible. In said manner it is possible to compensate elasticity and thermal expansion as described above.

To prevent the piston 64 from moving the seal 72 beyond the sealing surface 66, in the—in FIG. 1—axially bottom, inner end of the piston 64 a phase 78 is formed and on the closing portion 38 an end stop 80 is formed, which lies opposite the piston 64 and against which the piston 64 may rest in a defined manner.

Furthermore, in the region of said end stop 80 a seal 82 is inserted into the closing portion 38 and, together with an opposing sealing seat 84 formed on the piston 64, forms a redundant seal of the piston 64 in the normal position. The seal 82 may alternatively be inserted in the piston 64.

Formed on the inside of the end wall 30 is an end stop 86, against which the disk 18 rests in the—in relation to FIG. 1—top end position of the piston 64.

FIG. 2 shows an embodiment of a gas pressure accumulator 10, which is of a similar construction to the one illustrated in FIG. 1. In said gas pressure accumulator 10, however, the disk 18 is integrally connected to the rod 60 and a hollow cylinder 44'. The rod 60 is guided in an axially displaceable manner in a bore 54' of the mandrel 46 and is penetrated by a bore 62', which connects the bore 50 to the admission chamber 76. At the end directed towards the hollow cylinder 44' a piston 64' is integrally formed with the mandrel 46.

In said embodiment, during the stroke of the disk 18 the hollow cylinder 44' is moved, while the piston 64' remains stationary. Otherwise, the function of the valve arrangement is identical to that described above for FIG. 1.

In contrast to the embodiment of FIG. 1, an end stop 80' is formed on the piston 64'. Furthermore, there is disposed on the piston 64' an axially directed seal 82', which with an opposing sealing seat 84' on the disk 18 forms a redundant seal of the piston 64' in the normal position.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. Vehicle brake system having a gas pressure accumulator, which comprises a housing, the interior of which is divided by metal bellows into a gas-sensed gas chamber and a fluid chamber, wherein via a feed line a fluid is supplied under pressure to and removed from the fluid chamber, and provided between the fluid chamber and the feed line is a valve arrangement, which closes when the pressure in the feed line drops below a minimum value and opens when the pressure exceeds the minimum value and which closes when the pressure in the feed line exceeds a maximum value and opens when the pressure drops below the maximum value, wherein the valve arrangement comprises a piston, which is provided on the metal bellows and is displaceable along an axis between two sealing seats, wherein the sealing seats are arranged axially spaced-apart inside a hollow cylinder, which is provided in a fixed manner on the housing, and comprise sealing surfaces parallel to the piston axis, wherein disposed on the piston is at least one seal, which may effect sealing against at least one sealing seat.

2. Vehicle brake system having a gas pressure accumulator, which comprises a housing, the interior of which is divided by metal bellows into a gas-sensed gas chamber and a fluid chamber, wherein via a feed line a fluid may be supplied under pressure to and removed from the fluid chamber, and provided between the fluid chamber and the feed line is a valve arrangement, which closes when the pressure in the feed line drops below a minimum value and opens when the pressure exceeds the minimum value and which closes when the pressure in the feed line exceeds a maximum value and opens when the pressure drops below the maximum value, wherein the valve arrangement comprises a hollow cylinder, which is provided on the metal bellows, is directed along an axis and has two internally disposed, axially spaced-apart sealing seats, wherein the hollow cylinder is disposed in an axially displaceable manner around a piston provided in a fixed manner on the housing, and the sealing seats comprise sealing surfaces parallel to the piston axis.

3. Vehicle brake system according to claim 2, wherein connected to the hollow cylinder is a coaxial mandrel, on which the piston is guided or which is guided in the piston.

4. Vehicle brake system according to claim 2, wherein the metal bellows are constructed substantially in the shape of a hollow cylinder and the piston as well as the hollow cylinder are disposed radially inside the metal bellows.

5. Vehicle brake system according to claim 2, wherein the stroke motion of the metal bellows is delimited by two end stops.

6. Vehicle brake system according to claim 5, wherein on at least one end stop a seal or a sealing seat is formed.

7. Vehicle brake system according to claim 2, wherein disposed on the piston is at least one seal, which may effect sealing against at least one sealing seat.

8. Vehicle brake system having a gas pressure accumulator, which comprises a housing, the interior of which is divided by metal bellows into a gas-sensed gas chamber and a fluid chamber, wherein via a feed line a fluid is supplied under pressure to and removed from the fluid chamber, and provided between the fluid chamber and the feed line is a valve arrangement, which closes when the pressure in the feed line drops below a minimum value and opens when the pressure exceeds the minimum value and which closes when the pressure in the feed line exceeds a maximum value and opens when the pressure drops below the maximum value, wherein the valve arrangement comprises a piston, which is provided on the metal bellows and is displaceable along an axis between two sealing seats, wherein the sealing seats are arranged axially spaced-apart inside a hollow cylinder, which is provided in a fixed manner on the housing, and comprise sealing surfaces parallel to the piston axis, wherein the metal bellows are constructed substantially in the shape of a hollow cylinder and the piston as well as the hollow cylinder are disposed radially inside the metal bellows.

9. Vehicle brake system having a gas pressure accumulator, which comprises a housing, the interior of which is divided by metal bellows into a gas-sensed gas chamber and a fluid chamber, wherein via a feed line a fluid is supplied under pressure to and removed from the fluid chamber, and provided between the fluid chamber and the feed line is a valve arrangement, which closes when the pressure in the feed line drops below a minimum value and opens when the pressure exceeds the minimum value and which closes when the pressure in the feed line exceeds a maximum value and opens when the pressure drops below the maximum value, wherein the valve arrangement comprises a piston, which is provided on the metal bellows and is displaceable along an axis between two sealing seats, wherein the sealing seats are arranged axially spaced-apart inside a hollow cylinder, which is provided in a fixed manner on the housing, and comprise sealing surfaces parallel to the piston axis, wherein connected to the hollow cylinder is a coaxial mandrel, on which the piston is guided or which is guided in the piston.

10. Vehicle brake system according to claim 9, wherein the stroke motion of the metal bellows is delimited by two end stops.

11. Vehicle brake system according to claim 10, wherein on at least one end stop a seal or a sealing seat is formed.

12. Vehicle brake system having a gas pressure accumulator, which comprises a housing, the interior of which is divided by metal bellows into a gas-sensed gas chamber and a fluid chamber, wherein via a feed line a fluid is supplied under pressure to and removed from the fluid chamber, and provided between the fluid chamber and the feed line is a valve arrangement, which closes when the pressure in the feed line drops below a minimum value and opens when the pressure exceeds the minimum value and which closes when the pressure in the feed line exceeds a maximum value and opens when the pressure drops below the maximum value, wherein the valve arrangement comprises a piston, which is provided on the metal bellows and is displaceable along an axis between two sealing seats, wherein the sealing seats are arranged axially spaced-apart inside a hollow cylinder, which is provided in a fixed manner on the housing, and comprise sealing surfaces parallel to the piston axis, which sealing surfaces are engaged by the piston to provide a sliding seal therebetween.

13. Vehicle brake system according to claim 2, wherein the stroke motion of the metal bellows is delimited by two end stops.

14. Vehicle brake system according to claim 13, wherein on at least one end stop a seal or a sealing seat is formed.

* * * * *